(12) United States Patent
Modak et al.

(10) Patent No.: US 10,813,290 B2
(45) Date of Patent: Oct. 27, 2020

(54) COMPONENT AND METHOD FOR CROP RAMP AND BELT SUPPORT

(71) Applicant: Deere & Company, Moline, IL (US)

(72) Inventors: Shreyas P. Modak, Thane (IN); Mark A. Schuler, Geneseo, IL (US)

(73) Assignee: DEERE & COMPANY, Moline, IL (US)

( * ) Notice: Subject to any disclaimer, the term of this patent is extended or adjusted under 35 U.S.C. 154(b) by 197 days.

(21) Appl. No.: 16/005,475

(22) Filed: Jun. 11, 2018

(65) Prior Publication Data

US 2019/0373815 A1  Dec. 12, 2019

(51) Int. Cl.

| A01D 57/20 | (2006.01) |
|---|---|
| A01D 34/40 | (2006.01) |
| A01D 41/14 | (2006.01) |
| A01D 61/00 | (2006.01) |

(52) U.S. Cl.
CPC ............ *A01D 57/20* (2013.01); *A01D 34/40* (2013.01); *A01D 41/14* (2013.01); *A01D 61/002* (2013.01)

(58) Field of Classification Search
CPC ........ A01D 57/20; A01D 34/40; A01D 41/14; A01D 61/002; A01D 34/046; A01D 47/00; A01D 43/06; A01D 34/04
See application file for complete search history.

(56) References Cited

U.S. PATENT DOCUMENTS

| 1,917,604 | A | * | 7/1933 | Scranton, Jr. | .......... A01D 34/13 56/298 |
|---|---|---|---|---|---|
| 5,161,355 | A | | 11/1992 | Diederich | |
| 5,459,986 | A | * | 10/1995 | Talbot | .................. A01D 61/002 56/181 |
| 6,351,931 | B1 | | 3/2002 | Shearer | |
| 7,412,816 | B2 | * | 8/2008 | Coers | ..................... A01D 57/20 56/208 |
| 7,472,533 | B2 | * | 1/2009 | Talbot | .................... A01D 57/20 56/181 |
| 7,549,280 | B2 | * | 6/2009 | Lovett | .................... A01D 57/20 56/208 |
| 7,600,364 | B2 | * | 10/2009 | Lovett | ................. A01D 61/002 56/181 |
| 7,908,836 | B1 | * | 3/2011 | Rayfield | .............. A01D 61/002 56/181 |

(Continued)

FOREIGN PATENT DOCUMENTS

| EP | 1867228 A1 | 12/2007 |
|---|---|---|
| WO | 2014032178 A1 | 3/2014 |

OTHER PUBLICATIONS

European Search Report issued in counterpart European Patent Application No. 19179043.5 dated Nov. 6, 2019 (5 pages).

*Primary Examiner* — Arpad Fabian-Kovacs
(74) *Attorney, Agent, or Firm* — Foley & Lardner LLP (57) ABSTRACT

A crop ramp and belt support component for an agricultural harvesting head is provided. The crop ramp and belt support component includes a forward portion, a rear portion, and a belt support portion that are generally planar. The forward portion is inclined relative to the rear portion, and the rear portion extends from the forward portion. The belt support portion is substantially parallel to the rear portion and is configured to extend at least partially below an interior surface of a belt conveyor. The forward portion, the rear portion, and the belt support portion are fabricated as a unitary component.

20 Claims, 6 Drawing Sheets

(56) References Cited

U.S. PATENT DOCUMENTS

| | | | |
|---|---|---|---|
| 7,958,711 B1 | 6/2011 | Sauerwein | |
| 8,205,421 B2 | 6/2012 | Sauerwein et al. | |
| 8,291,686 B1* | 10/2012 | Cormier | A01D 61/002 56/181 |
| 8,484,939 B1* | 7/2013 | Cormier | A01D 43/06 56/158 |
| 8,511,050 B1* | 8/2013 | Cormier | A01D 41/14 56/158 |
| 9,271,443 B2* | 3/2016 | Sethi | A01D 41/14 |
| 9,338,941 B2 | 5/2016 | Herringshaw et al. | |
| 9,591,802 B2* | 3/2017 | Allochis | A01D 34/18 |
| 9,635,810 B2* | 5/2017 | Leys | A01D 34/14 |
| 9,814,183 B2* | 11/2017 | Allochis | A01D 34/18 |
| 2011/0154794 A1* | 6/2011 | Coers | A01D 41/14 56/181 |
| 2012/0043185 A1* | 2/2012 | Dow | A01D 61/002 198/837 |
| 2012/0216500 A1* | 8/2012 | Sauerwein | A01D 41/14 56/181 |
| 2012/0233974 A1* | 9/2012 | Cormier | A01D 61/002 56/181 |
| 2013/0160417 A1* | 6/2013 | Huseman | A01D 41/14 56/181 |
| 2014/0059995 A1* | 3/2014 | Cormier | A01D 43/06 56/181 |
| 2014/0165526 A1* | 6/2014 | Leys | A01D 61/02 56/181 |
| 2014/0196427 A1* | 7/2014 | Fuechtling | A01D 41/14 56/181 |
| 2015/0007544 A1* | 1/2015 | Herringshaw | A01D 34/40 56/181 |
| 2016/0316620 A1 | 11/2016 | Allochis | |
| 2017/0172068 A1* | 6/2017 | Leys | A01D 34/14 |
| 2019/0230858 A1* | 8/2019 | Shearer | A01D 41/145 |

* cited by examiner

COMPONENT AND METHOD FOR CROP RAMP AND BELT SUPPORT

FIELD OF THE DISCLOSURE

The present disclosure relates generally to agricultural harvesting equipment. More particularly, it relates to agricultural harvesting heads having crop ramp and belt support component.

BACKGROUND

Grain harvesting operations for crops such as wheat, soybeans, and rice are often completed by agricultural machines that include multiple reciprocating knives at the leading edge of the machine. The reciprocating knives sever the crop plants at their roots, permitting the harvested crops to fall onto one or more conveyor belts. Typically, a crop ramp is provided that ensures that harvested crop material is effectively conveyed to an exterior surface of a conveyor belt.

Harvesting operations generally create a significant amount of crop residue that must be controlled. Otherwise, crop residue may become lodged in critical areas and interfere with the movement of a conveyor belt. In severe cases, buildup may result in premature wear or stall of a conveyor belt.

SUMMARY

In accordance with one aspect of the invention, a crop ramp and belt support component for an agricultural harvesting head is provided. The crop ramp and belt support component includes a forward portion, a rear portion, and a belt support portion that are generally planar. The forward portion is inclined relative to the rear portion, and the rear portion extends from the forward portion. The belt support portion is substantially parallel to the rear portion and is configured to extend at least partially below an interior surface of a belt conveyor. The forward portion, the rear portion, and the belt support portion are fabricated as a unitary component.

The unitary component may be fabricated from ultra-high-molecular-weight polyethylene. The unitary component may be fabricated using an extrusion process. The unitary component may have a substantially constant extruded wall thickness. The extruded wall thickness may range from 3 mm to 10 mm.

The crop ramp and belt support component may include a belt overhang portion that is generally planar and configured to extend at least partially above an exterior surface of the belt conveyor. The belt overhang portion may be substantially parallel to the belt support portion. The region that the belt overhang portion overlaps the exterior surface of the belt conveyor may range from 10 mm to 25 mm. The crop ramp and belt support component may include a bevel portion that is generally planar and inclined relative to the belt support portion. The angle of inclination between the belt support portion and the bevel portion may be approximately 30 degrees.

In accordance with another aspect of the invention, an agricultural harvesting head is provided. The agricultural harvesting head includes a frame that extends laterally, a reciprocating knife that is supported on the frame, a belt conveyor that is supported on the frame and driven in a lateral direction, and a crop ramp and belt support component. The crop ramp and belt support component includes a forward portion, a rear portion, and a belt support portion that are generally planar. The forward portion is inclined relative to the rear portion, and the rear portion extends from the forward portion. The belt support portion is substantially parallel to the rear portion and is configured to extend at least partially below an interior surface of a belt conveyor. The forward portion, the rear portion, and the belt support portion are fabricated as a unitary component.

The crop ramp and belt support component may include a belt overhang portion that is generally planar and configured to extend at least partially above an exterior surface of the belt conveyor. The belt overhang portion may be substantially parallel to the belt support portion. The region that the belt overhang portion overlaps the exterior surface of the belt conveyor may range from 10 mm to 25 mm. The crop ramp and belt support component may include a bevel portion that is generally planar and inclined relative to the belt support portion. The angle of inclination between the belt support portion and the bevel portion may be approximately 30 degrees.

In accordance with yet another aspect of the invention, a method of fabricating a crop ramp and belt support component for an agricultural harvesting head is provided. The method includes providing a forward portion that is generally planar, providing a rear portion that is generally planar and that extends from the forward portion, the forward portion inclined relative to the rear portion, and providing a belt support portion that is generally planar and substantially parallel to the rear portion. The belt support portion is configured to extend at least partially below an interior surface of a belt conveyor and the forward portion, the rear portion, and the belt support portion form a unitary component.

The method may include providing a belt overhang portion that is generally planar and configured to extend at least partially above an exterior surface of the belt conveyor. The belt overhang portion may be substantially parallel to the belt support portion. The method may include providing a bevel portion that is generally planar and inclined relative to the belt support portion. The angle of inclination between the belt support portion and the bevel portion may be approximately 30 degrees.

BRIEF DESCRIPTION OF THE DRAWINGS

Exemplary embodiments will become more fully understood from the following detailed description, taken in conjunction with the accompanying drawings, wherein like reference numerals refer to like elements, and.

DETAILED DESCRIPTION

Referring generally to the FIGURES, a crop ramp and belt support component is depicted, according to various embodiments. One or more conveyor belts are often utilized to transfer harvested crops from a cutting implement to a collecting device (e.g., an agricultural combine). A crop ramp is situated between the cutting implement and the conveyor belts to provide a smooth path of travel for the crops. The unitary design of the crop ramp and belt support of some embodiments helps seal against crop losses, prevents ingress of foreign objects into critical moving parts, and protects the belt against excessive wear.

Figure 1:
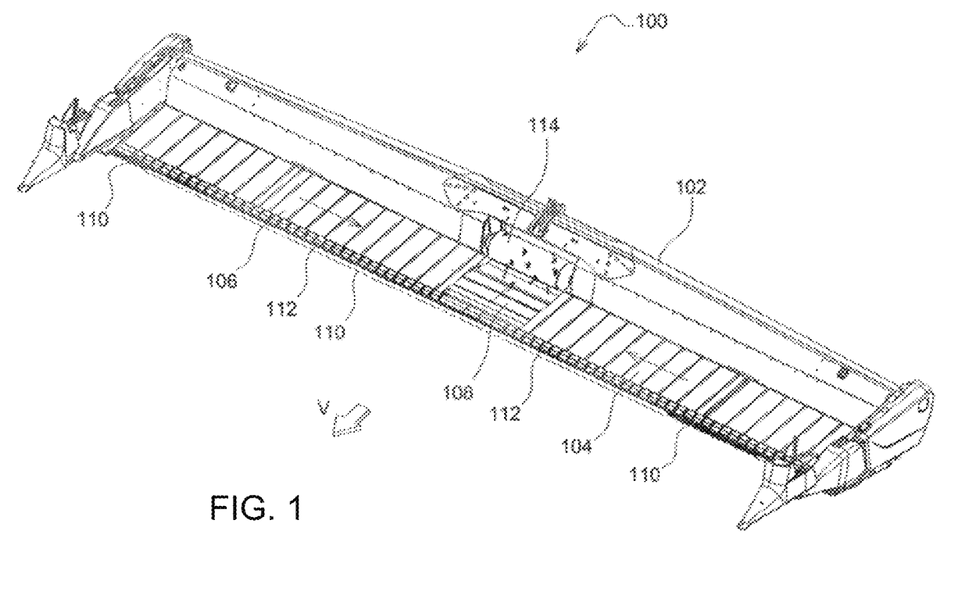
FIG. 1 is a perspective view of an agricultural harvesting head, according to some embodiments.

Referring now to FIG. 1, an agricultural harvesting head 100 is depicted, according to some embodiments. The agricultural harvesting head 100 includes a frame 102 that extends laterally across substantially the entire width of the head 100. The frame 102 is configured to support a left side belt conveyor 104, a right side belt conveyor 106, a center belt conveyor 108, a reciprocating knife portion 110, multiple crop ramp segments 112, and a feed drum 114.

As the agricultural harvesting head 100 travels in the direction indicated by the arrow labeled "V", the reciprocating knives 110 are configured to sever crop plants at their roots, thereby freeing them from the soil. Once severed, the crop ramp segments 112 direct the crops upward and rearward until they alternatively fall onto the left side belt conveyor 104, the right side belt conveyor 106, or the center belt conveyor 108.

Each of the left side belt conveyor 104, the right side belt conveyor 106, and the center belt conveyor 108 is driven by motors (not shown) and supported on rollers (not shown). The left side belt conveyor 104 and the right side belt conveyor 106 are similarly configured to carry harvested crops laterally on an upper surface of the belt conveyors 104, 106 in a direction perpendicular to the direction of travel "V" and to deposit the crops on the center belt conveyor 108.

The center belt conveyor 108 is configured to carry harvested crops deposited on an upper surface of the belt conveyor 108 rearward and underneath the feed drum 114. In some embodiments, the agricultural harvesting head 100 is supported on a feederhouse (not shown) on the front of an agricultural combine. The feederhouse is configured to receive harvested crop material that passes underneath the feed drum 114 and to transmit the harvested crop material into the agricultural combine for further processing and storage.

Figure 2:
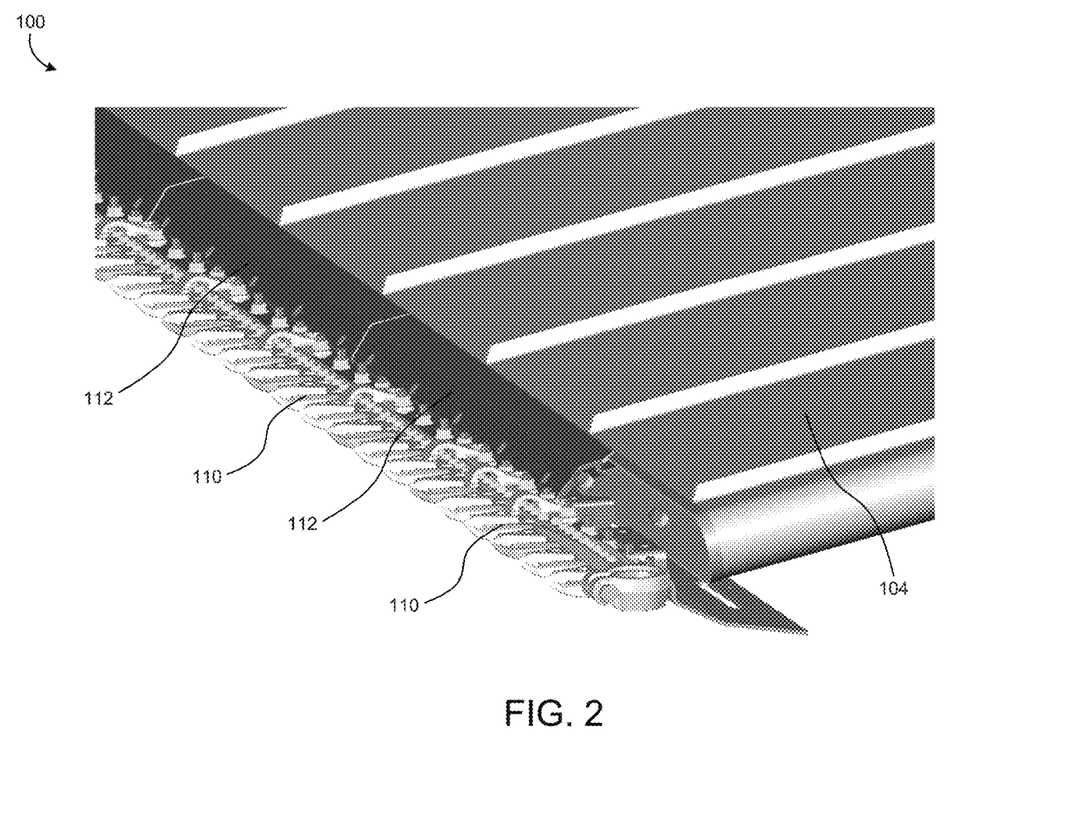
FIG. 2 is a detail view of the agricultural harvesting head of FIG. 1, according to some embodiments.

Referring now to FIG. 2, a detail view of the agricultural harvesting head 100 is depicted, according to some embodiments. Although FIG. 2 specifically depicts the portion of the harvesting head 100 containing the left side belt conveyor 104, it should be understood that the left side belt conveyor 104 and the right side belt conveyor 106 are symmetrical, and all description included below with reference to interaction of other components with the left side belt conveyor 104 is equally applicable to the right side belt conveyor 106. As shown, in some embodiments, the agricultural harvesting head 100 includes multiple crop ramp segments 112. Each crop ramp segment 112 may be configured to engage with two adjacent crop ramp segments 112 such that a continuous upper crop ramp surface is provided that extends across substantially the entire width of the agricultural harvesting head 100. In other embodiments, the agricultural harvesting head 100 includes a single crop ramp segment 112 that extends across substantially the entire width of the head 100.

Figure 3:
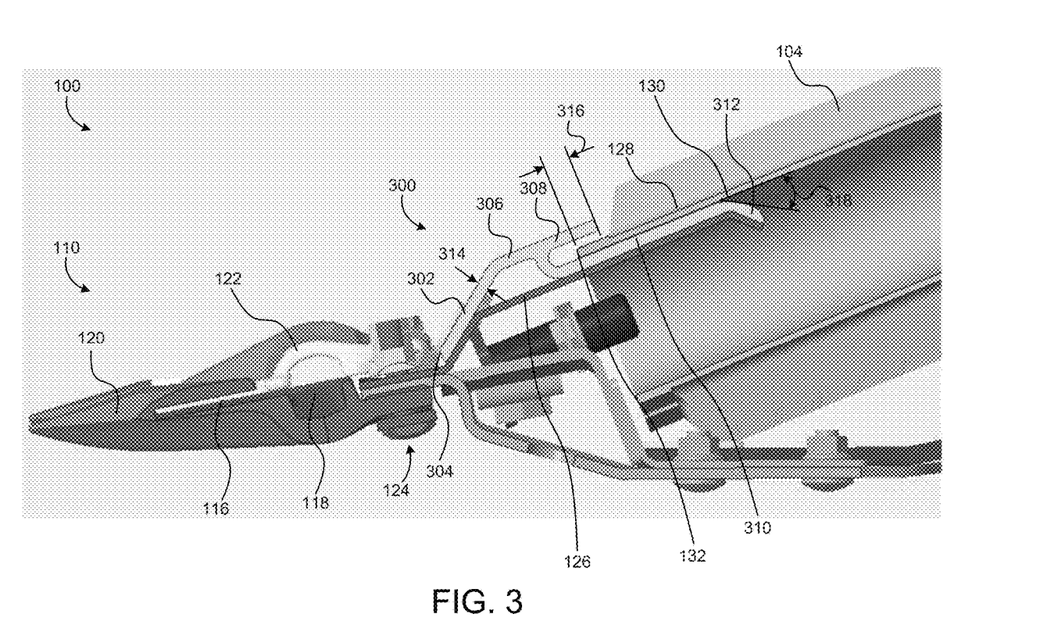
FIG. 3 is a sectional view of the agricultural harvesting head of FIG. 1 depicting a closed top crop ramp and belt support component, according to some embodiments.

Turning now to FIG. 3, a sectional view of the agricultural harvesting head 100 is depicted, according to some embodiments. As shown, in addition to the components described above (i.e., reciprocating knife portion 110, belt conveyor 104), the agricultural harvesting head 100 includes a closed top crop ramp and belt support component 300. In some embodiments, closed top component 300 is identical or substantially similar to crop ramp segment 112, described above with reference to FIGS. 1-2.

The reciprocating knife portion 110 of the agricultural harvesting head includes, among other components, a knife head 116, a knife back 118, a knife guard 120, and a hold down 122. In operation, the knife head 116 pivots relative to the knife back 118. The knife guard 120 protects and maintains a flat cutting surface for the knife head 116, while the hold down 122 exerts a downward force on the knife head 116 to hold the knife head 116 against the knife guard 120 and ensure a clean cutting action. The knife guard 120 is fastened to structural components of the harvesting head 100 at knife guard mounting point 124.

The closed top crop ramp and belt support component 300 is shown to include a forward portion 302 that is generally planar and upwardly inclined (in a front-to-rear direction) in order to guide harvested crops for deposit onto the belt conveyor 104. The forward portion 302 includes a leading edge 304 that is fixed near the knife guard mounting point 124. Opposite the leading edge 304, a rear portion 306 extends from the forward portion 302. The rear portion 306 is generally planar and parallel to an exterior surface 128 and an interior surface 130 of the belt conveyor 104. Thus, as the forward portion 302 is inclined relative to surfaces 128 and 130, so too is the forward portion 302 inclined relative to the rear portion 306.

The closed top component is further shown to include a belt overhang portion 308 that extends at least partially above the exterior surface 128 of the belt conveyor 104. Belt overhang portion 308 may act as a barrier that prevents crop losses and protects the leading edge 132 of the belt conveyor 104 from wear and impedance due to foreign object entry. In some embodiments, the belt overhang portion 308 lightly contacts the exterior surface 128, although in other embodiments, a gap is maintained between the belt overhang portion 308 and the exterior surface 128. In some embodiments, the region 316 that the belt overhang portion 308 extends over the exterior surface of the belt conveyor 104 ranges from 10-25 mm, although the length of region 316 may be adjusted based on the properties of the crop to be harvested or other design considerations.

An additional advantage of the belt overhang portion 308 of the closed component 300 may include constraint of the belt conveyor 104 in some embodiments. As the agricultural harvesting head 100 is configured to travel near to the ground in order to harvest as much usable crop as possible, discontinuities in the soil (e.g., rocks, foreign objects) may cause the reciprocating knife portion 110 to flex in a vertical direction. Movement of the reciprocating knife portion 110 may result in corresponding movement of the belt conveyor 104. This movement may be constrained as the belt conveyor 104 contacts the belt overhang portion 308 to prevent misalignment of the belt conveyor 104.

Still referring to FIG. 3, the closed top component 300 is shown to include a belt support portion 310 that extends at least partially below the interior surface 130 of the belt conveyor 104. The unitary design of the closed top component 300 (i.e., the lack of any gaps or joinder of parts between the forward portion 302, rear portion 306, and belt support portion 310) prevents the ingress of crop debris and other foreign materials into sensitive moving components of the agricultural head 100 in some embodiments. In some embodiments, the closed top component 300 is coupled to a structural element 126 (e.g., a weldment) that provides additional support for the belt conveyor 104. The belt support portion 310 terminates in a bevel portion 312 that is generally planar and inclined relative to the belt support portion 310. The bevel portion 312 may ease the assembly of the agricultural harvesting head 100, particularly in locating the belt support portion 310 below the interior surface 130 of the belt conveyor 104. In some embodiments, the angle of inclination 318 between the belt support portion 310 and the bevel portion 312 is approximately 30 degrees.

Figure 4:
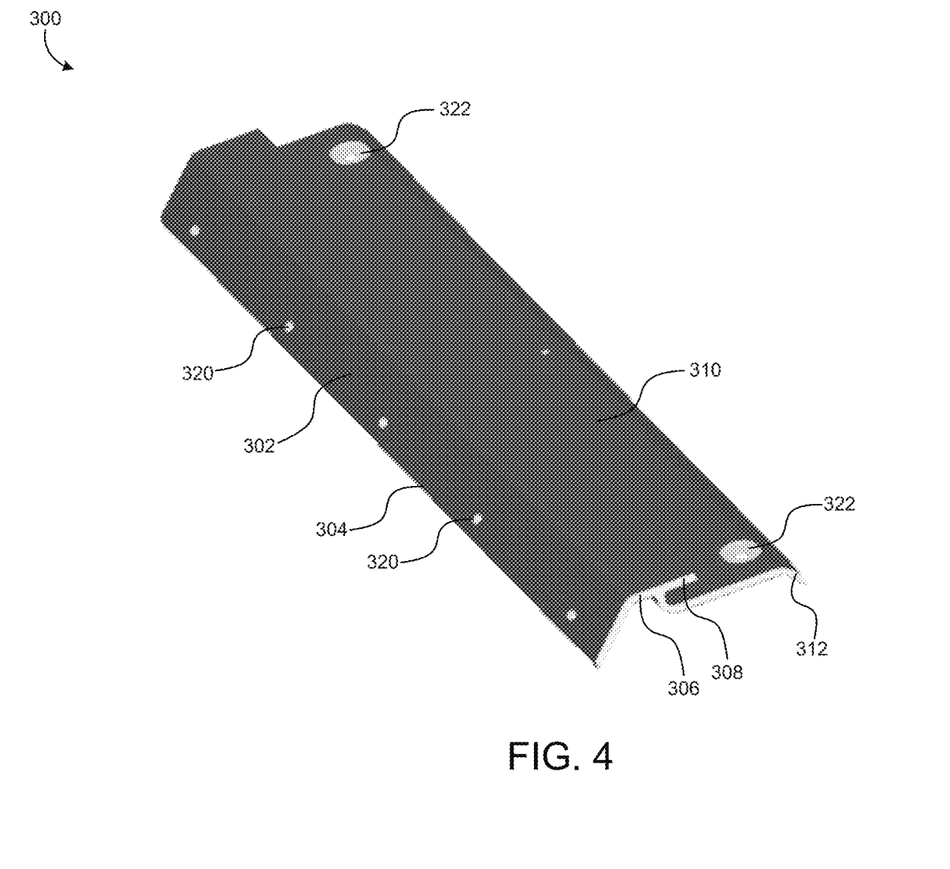
FIG. 4 is a perspective view of the closed top crop ramp and belt support component of FIG. 3, according to some embodiments.
Figure 5:
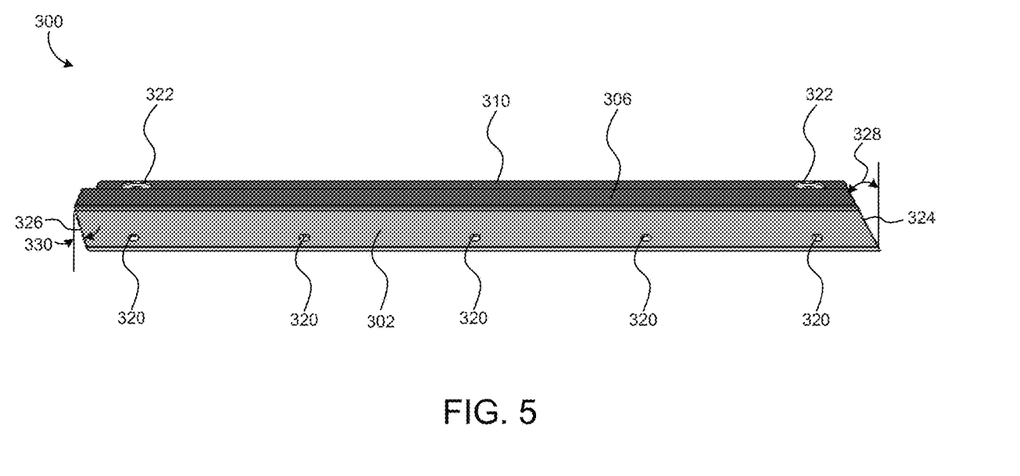
FIG. 5 is a front elevation view of the closed top crop ramp and belt support component of FIG. 3, according to some embodiments.

Referring now to FIGS. 4-5, a perspective view and a front elevation view of an isolated closed top crop ramp and belt support component 300 are respectively depicted, according to some embodiments. As described above with reference to FIG. 3, the closed top component 300 includes a forward portion 302 with leading edge 304, a rear portion 306, a belt overhang portion 308, a belt support portion 310, and a bevel portion 312. The closed top component 300 is further shown to include multiple crop ramp mounting features 320 and 322 disposed on the forward portion 302 and the belt support portion 310, respectively. Crop ramp mounting features 320 and 322 may be any size or shape required to accommodate the fasteners (e.g., rivets) required to attach the closed top component 300 to the structural components (e.g., weldment 126) of the agricultural harvesting head 100.

In some embodiments, the agricultural harvesting head 100 includes multiple closed top components 300 that are fastened to structural components and/or each other, such that a continuous crop ramp surface is formed across the span of the agricultural harvesting head 100. In some embodiments, the closed top components 300 may be configured to partially overlap each other. In other embodiments, a gap is maintained between each of the closed top components 300. As shown in FIG. 5, the closed top component 300 includes a first end surface 324 and a second end surface 326. The end surfaces 324 and 326 may not be perpendicular to the rear portion 306 and the belt support portion 310. Instead, end surfaces 324 and 326 may be inclined in the direction of the crop flow from the left side belt conveyor 104 to the center belt conveyor 108. In some embodiments, the bevel angle 328 of the end surface 324 may be equal to the bevel angle 330 of the end surface 326 (i.e., the first end surface 324 and the second end surface 326 are parallel). For example, both bevel angles 328 and 330 may be approximately 30 degrees. In other embodiments, the bevel angle 328 is not equal to the bevel angle 330. In still further embodiments, a single closed top component 300 that extends across substantially the entire width of the head 100 may be utilized, as opposed to multiple closed top components 300.

Figure 6:
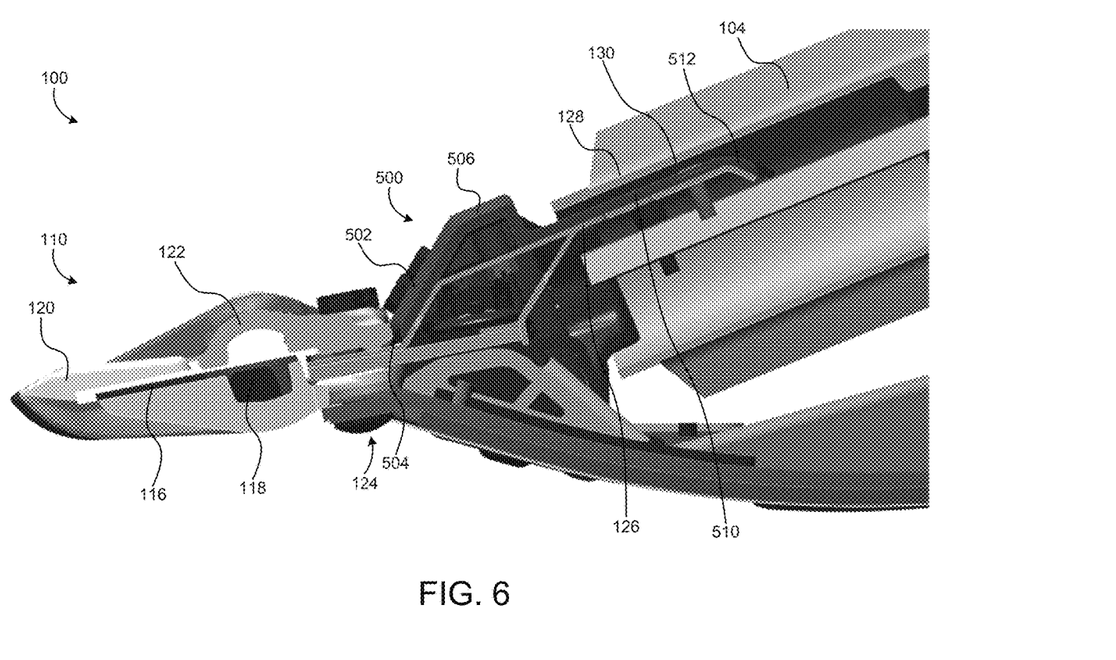
FIG. 6 is a sectional view of the agricultural harvesting head of FIG. 1 depicting an open top crop ramp and belt support component, according to some embodiments.

Referring now to FIG. 6, a sectional view of an open top crop ramp and belt support component 500 that may be utilized in the agricultural harvesting head 100 is depicted, according to some embodiments. Similar to the closed top component 300 described above with reference to FIGS. 3-5, the open top component 500 is shown to include a generally planar forward portion 502 with a leading edge 504 that is fixed near the knife guard mounting point 124. Opposite the leading edge 504, a generally planar rear portion 506 extends from the forward portion 502, and a generally planar belt support portion 510 extends at least partially under the interior surface 130 of the belt conveyor 104. The belt support portion 510 terminates in a bevel portion 512. The unitary design of the open top component 500 (i.e., the lack of any gaps or joinder of parts between the forward portion 502, rear portion 506, and belt support portion 510) prevents the ingress of crop debris and other foreign materials into sensitive moving components of the agricultural head 100 in some embodiments. However, in contrast to the closed top component 300, the open top component 500 does not contain a belt overhang portion to constrain the exterior surface 128 of the belt conveyor 104. The open top component 500 may be utilized when wear of the exterior surface 128 of the belt conveyor 104 is of particular concern.

In some embodiments, the unitary crop ramp and belt support component (e.g., closed top component 300, open top component 500) is fabricated from ultra-high-molecular-weight (UHMW) polyethylene using an extrusion process (e.g., ram extrusion). In various embodiments, the wall thickness of the extrusion (e.g., wall thickness 314) is constant across the unitary component and ranges from 3-10 mm. The belt conveyor (e.g., belt conveyor 104) may be fabricated from rubber-impregnated fabric. The use of UHMW for the unitary crop ramp and belt support component may be advantageous due to the material properties of UHMW, which include excellent impact strength and abrasion resistance. In addition, UHMW has a low coefficient of friction, which ensures smooth travel of the belt conveyor as it passes over the belt support portion (e.g., belt support portion 310, belt support portion 510) of the unitary component. However, in other embodiments, the unitary crop ramp and belt support component may be fabricated from any suitable material (e.g., glass-filled nylon), using any suitable fabrication process (e.g., compression molding, injection molding, sintering).

It should be understood that the particular embodiments shown and discussed herein are not the only ways in which the invention can exist. They are the currently preferred embodiments of the invention. One skilled in the art of agricultural harvester and agricultural harvesting head design and manufacture can readily see other variations that would also fall within the scope of the appended claims.

What is claimed is:

1. A crop ramp and belt support component for an agricultural harvesting head, the crop ramp and belt support component comprising:
    a forward portion that is generally planar;
    a rear portion that is generally planar and that extends from the forward portion, the forward portion inclined relative to the rear portion; and
    a belt support portion that is generally planar and substantially parallel to the rear portion, the belt support portion configured to extend at least partially below an interior surface of a belt conveyor;
    wherein the forward portion, the rear portion, and the belt support portion are fabricated as a unitary component.

2. The crop ramp and belt support component of claim 1, wherein the unitary component is fabricated from ultra-high-molecular-weight polyethylene.

3. The crop ramp and belt support component of claim 1, wherein the unitary component is fabricated using an extrusion process.

4. The crop ramp and belt support component of claim 3, wherein the unitary component has a substantially constant extruded wall thickness.

5. The crop ramp and belt support component of claim 4, wherein the extruded wall thickness ranges from 3 mm to 10 mm.

6. The crop ramp and belt support component of claim 1, further comprising a belt overhang portion that is generally planar and configured to extend at least partially above an exterior surface of the belt conveyor.

7. The crop ramp and belt support component of claim 6, wherein the belt overhang portion is substantially parallel to the belt support portion.

8. The crop ramp and belt support component of claim 6, wherein a region that the belt overhang portion overlaps the exterior surface of the belt conveyor ranges from 10 mm to 25 mm.

9. The crop ramp and belt support component of claim 1, further comprising a bevel portion that is generally planar and inclined relative to the belt support portion.

10. The crop ramp and belt support component of claim 9, wherein an angle of inclination between the belt support portion and the bevel portion is approximately 30 degrees.

11. An agricultural harvesting head comprising:
a frame that extends laterally;
a reciprocating knife that is supported on the frame;
a belt conveyor that is supported on the frame and driven in a lateral direction; and
a crop ramp and belt support component comprising:
a forward portion that is generally planar;
a rear portion that is generally planar and that extends from the forward portion, the forward portion inclined relative to the rear portion; and
a belt support portion that is generally planar and substantially parallel to the rear portion, the belt support portion configured to extend at least partially below an interior surface of the belt conveyor;
wherein the forward portion, the rear portion, and the belt support portion are fabricated as a unitary component.

12. The agricultural harvesting head of claim 11, wherein the crop ramp and belt support component further comprises a belt overhang portion that is generally planar and configured to extend at least partially above an exterior surface of the belt conveyor.

13. The agricultural harvesting head of claim 12, wherein the belt overhang portion is substantially parallel to the belt support portion.

14. The agricultural harvesting head of claim 13, wherein a region that the belt overhang portion overlaps the exterior surface of the belt conveyor ranges from 10 mm to 25 mm.

15. The agricultural harvesting head of claim 11, wherein the crop ramp and belt support component further comprises a bevel portion that is generally planar and inclined at an angle relative to the belt support portion of approximately 30 degrees.

16. A method of fabricating a crop ramp and belt support component for an agricultural harvesting head, the method comprising:
providing a forward portion that is generally planar;
providing a rear portion that is generally planar and that extends from the forward portion, the forward portion inclined relative to the rear portion; and
providing a belt support portion that is generally planar and substantially parallel to the rear portion, the belt support portion configured to extend at least partially below an interior surface of a belt conveyor;
wherein the forward portion, the rear portion, and the belt support portion form a unitary component.

17. The method of claim 16, further comprising providing a belt overhang portion that is generally planar and configured to extend at least partially above an exterior surface of the belt conveyor.

18. The method of claim 17, wherein the belt overhang portion is substantially parallel to the belt support portion.

19. The method of claim 16, further comprising providing a bevel portion that is generally planar and inclined relative to the belt support portion.

20. The method of claim 19, wherein an angle of inclination between the belt support portion and the bevel portion is approximately 30 degrees.

* * * * *